(12) United States Patent
Chen et al.

(10) Patent No.: US 11,360,618 B2
(45) Date of Patent: Jun. 14, 2022

(54) METHOD FOR MANUFACTURING TOUCH SCREEN, DISPLAY DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Jun Chen, Beijing (CN); Ming Zhang, Beijing (CN); Qicheng Chen, Beijing (CN); Jun Li, Beijing (CN); Weijie Ma, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 609 days.

(21) Appl. No.: 16/335,791

(22) PCT Filed: Aug. 3, 2018

(86) PCT No.: PCT/CN2018/098485
§ 371 (c)(1),
(2) Date: Mar. 22, 2019

(87) PCT Pub. No.: WO2019/091155
PCT Pub. Date: May 16, 2019

(65) Prior Publication Data
US 2021/0349571 A1   Nov. 11, 2021

(30) Foreign Application Priority Data
Nov. 8, 2017 (CN) .......................... 201711091720.3

(51) Int. Cl.
G06F 3/041 (2006.01)
G06F 3/044 (2006.01)

(52) U.S. Cl.
CPC .......... G06F 3/0443 (2019.05); G06F 3/0412 (2013.01); *G06F 2203/04102* (2013.01); *G06F 2203/04103* (2013.01)

(58) Field of Classification Search
CPC ................. G06F 3/0412; G06F 3/0443; G06F 2203/04102; G06F 2203/04103
See application file for complete search history.

(56) References Cited

U.S. PATENT DOCUMENTS

2013/0266724 A1* 10/2013 Cheong ................. G06F 3/0443
427/97.2
2015/0107977 A1* 4/2015 Lee ....................... G06F 3/0443
216/13
(Continued)

FOREIGN PATENT DOCUMENTS

CN   101893966 A   11/2010
CN   102282531     12/2011
(Continued)

OTHER PUBLICATIONS

Office action from Chinese Application No. 201711091720.3 dated Jan. 22, 2021.
(Continued)

Primary Examiner — Ryan A Lubit
(74) Attorney, Agent, or Firm — Calfee, Halter & Griswold LLP

(57) ABSTRACT

A method for manufacturing a touch screen which includes: providing a substrate including a display area and a non-display area located around the display area; forming a first transparent conductive layer on a side of the substrate, and forming a metal layer on a surface of the first transparent conductive layer facing away from the substrate; forming a (Continued)

first photoresist pattern on the metal layer, at least a portion of the first photoresist pattern corresponding to a metal trace to be formed in the non-display area; performing an etching process by using the first photoresist pattern to form the metal trace; forming a second photoresist pattern only in one of the display area and the non-display area, and performing an etching process to form a first transparent conductive pattern in the display area.

12 Claims, 6 Drawing Sheets

(56) References Cited

U.S. PATENT DOCUMENTS

| | | | |
|---|---|---|---|
| 2015/0116245 A1 | 4/2015 | Tseng et al. | |
| 2015/0301637 A1* | 10/2015 | Chen | G06F 3/041 345/173 |
| 2016/0282975 A1* | 9/2016 | Wu | H01L 27/1225 |
| 2017/0139518 A1* | 5/2017 | Oh | G06F 3/047 |
| 2017/0277314 A1* | 9/2017 | Chen | G06F 3/0416 |

FOREIGN PATENT DOCUMENTS

| | | |
|---|---|---|
| CN | 102819367 A | 12/2012 |
| CN | 103049122 A | 4/2013 |
| CN | 103345337 A | 10/2013 |
| CN | 103399664 A | 11/2013 |
| CN | 103809804 A | 5/2014 |
| CN | 104571668 A | 4/2015 |
| CN | 107229360 A | 10/2017 |
| CN | 107861656 A | 3/2018 |
| JP | 60050076 B2 | 12/2016 |

OTHER PUBLICATIONS

Search Report and Written Opinion for International Application No. PCT/CN2018/098485 dated Nov. 7, 2018.
First Office Action for Chinese Patent Application No. 201711091720.3 dated Apr. 25, 2019.

* cited by examiner

METHOD FOR MANUFACTURING TOUCH SCREEN, DISPLAY DEVICE

RELATED APPLICATIONS

The present application is the U.S. national phase entry of the international application PCT/CN2018/098485, with an international filing date of Aug. 3, 2018, which claims the benefit of Chinese Patent Application No. 201711091720.3, filed on Nov. 8, 2017, the entire disclosures of which are incorporated herein by reference.

TECHNICAL FIELD

The present disclosure relates to the field of display technology, and particularly to a method for manufacturing a touch screen, and a display device including the touch screen manufactured by the method.

BACKGROUND

In recent years, touch screen as an input tool is currently the most simple, convenient and natural medium for human-computer interaction. Touch screens are increasingly being used in a variety of electronic products, such as mobile phones, laptops, MP3/MP4 players, e-books, and so on. In order to achieve a better display effect, the touch screen is gradually developed into a thin structure with a large size and a narrow frame.

The middle area of the touch screen type electronic device is a display area and a touch area, and a frame is located at the periphery of the electronic device. Touch traces are usually placed in the frame. In practical applications, in order to facilitate hand-holding, it is desirable to make the frame of the touch screen type electronic device as narrow as possible without reducing the width of the display area, and the line spacing of the touch traces at the periphery is set to be less than 10 μm. In addition, in order to realize three-dimensional touch control, the edge of the touch screen must be flexible, that is, a flexible touch screen should be realized. Metal traces are typically formed from flexible metal materials, but these materials have insufficient adhesion on glass or polymer substrates. In addition, when layered etching is performed on a composite film layer formed of a metal material and other layers, misalignment will greatly affect the line width limit of the metal layer.

SUMMARY

The present disclosure provides a method for manufacturing a touch screen, and a display device.

According to a first aspect of the present disclosure, a method for manufacturing a touch screen is provided. The method includes: providing a substrate, the substrate including a display area and a non-display area located around the display area; forming a first transparent conductive layer on a side of the substrate, and forming a metal layer on a surface of the first transparent conductive layer facing away from the substrate; forming a first photoresist pattern on the metal layer, at least a portion of the first photoresist pattern corresponding to a metal trace to be formed in the non-display area; performing an etching process by using the first photoresist pattern to form the metal trace; forming a second photoresist pattern only in one of the display area and the non-display area, and performing an etching process to form a first transparent conductive pattern in the display area; forming a protective layer on the first transparent conductive pattern and the metal trace; and forming a second transparent conductive pattern on a portion of the protective layer corresponding to the first transparent conductive pattern.

In an exemplary embodiment, the first photoresist pattern is distributed only in the non-display area.

In an exemplary embodiment, the step of performing an etching process by using the first photoresist pattern to form the metal trace includes: etching the metal layer by using the first photoresist pattern to form the metal trace.

In an exemplary embodiment, the step of forming a second photoresist pattern only in one of the display area and the non-display area, and performing an etching process to form a first transparent conductive pattern in the display area includes: forming, only in the display area, a second photoresist pattern corresponding to the first transparent conductive pattern, and performing an etching process to form the first transparent conductive pattern in the display area.

In an exemplary embodiment, the step of performing an etching process by using the first photoresist pattern to form the metal trace includes: etching the metal layer and the first transparent conductive layer by using the first photoresist pattern to form the metal trace.

In an exemplary embodiment, the step of forming a second photoresist pattern only in one of the display area and the non-display area, and performing an etching process to form a first transparent conductive pattern in the display area includes: forming a second transparent conductive layer in the display area and the non-display area; and forming, only in the display area, a second photoresist pattern corresponding to the first transparent conductive pattern, and performing an etching process to form the first transparent conductive pattern in the display area.

In an exemplary embodiment, the method further includes: thinning the first transparent conductive pattern before forming the protective layer on the first transparent conductive pattern and the metal trace.

In an exemplary embodiment, the first photoresist pattern is distributed in the display area and the non-display area; the step of performing an etching process by using the first photoresist pattern to form the metal trace includes: performing an etching process on the metal layer by using the first photoresist pattern to form a metal pattern located in the display area and the metal trace.

In an exemplary embodiment, the step of performing an etching process by using the first photoresist pattern to form the metal trace further includes: performing an etching process on the first transparent conductive layer by using the first photoresist pattern to form a transparent conductive pattern located in the non-display area and the first transparent conductive pattern; and removing the metal pattern located in the display area.

In an exemplary embodiment, the step of removing the metal pattern located in the display area includes: forming a photoresist layer covering the metal trace in the non-display area to protect the metal trace; and performing an etching process on the metal pattern located in the display area, thereby removing the metal pattern located in the display area.

In an exemplary embodiment, the substrate is one of a COP substrate, a PI substrate, and a glass substrate.

In an exemplary embodiment, a material of the first transparent conductive layer is one of ITO, FZO, AZO, FTO, GZO, and IMO.

In an exemplary embodiment, a material of the second transparent conductive layer is one of ITO, FZO, AZO, FTO, GZO, and IMO.

In an exemplary embodiment, a material of the metal trace is a flexible metal material.

According to a second aspect of the present disclosure, a display device is provided. The display device includes a touch screen manufactured by the above-described method.

BRIEF DESCRIPTION OF THE DRAWINGS

The accompanying drawings herein are incorporated into the specification and form a part of this specification, showing exemplary embodiments consistent with the present disclosure, and used together with the specification to explain the principles of the present disclosure. Obviously, the drawings in the following description are only some embodiments of the disclosure, and for those of ordinary skills in the art, other drawings may be obtained according to these drawings under the premise of not paying out creative work.

DETAILED DESCRIPTION OF THE DISCLOSURE

Figure 1:
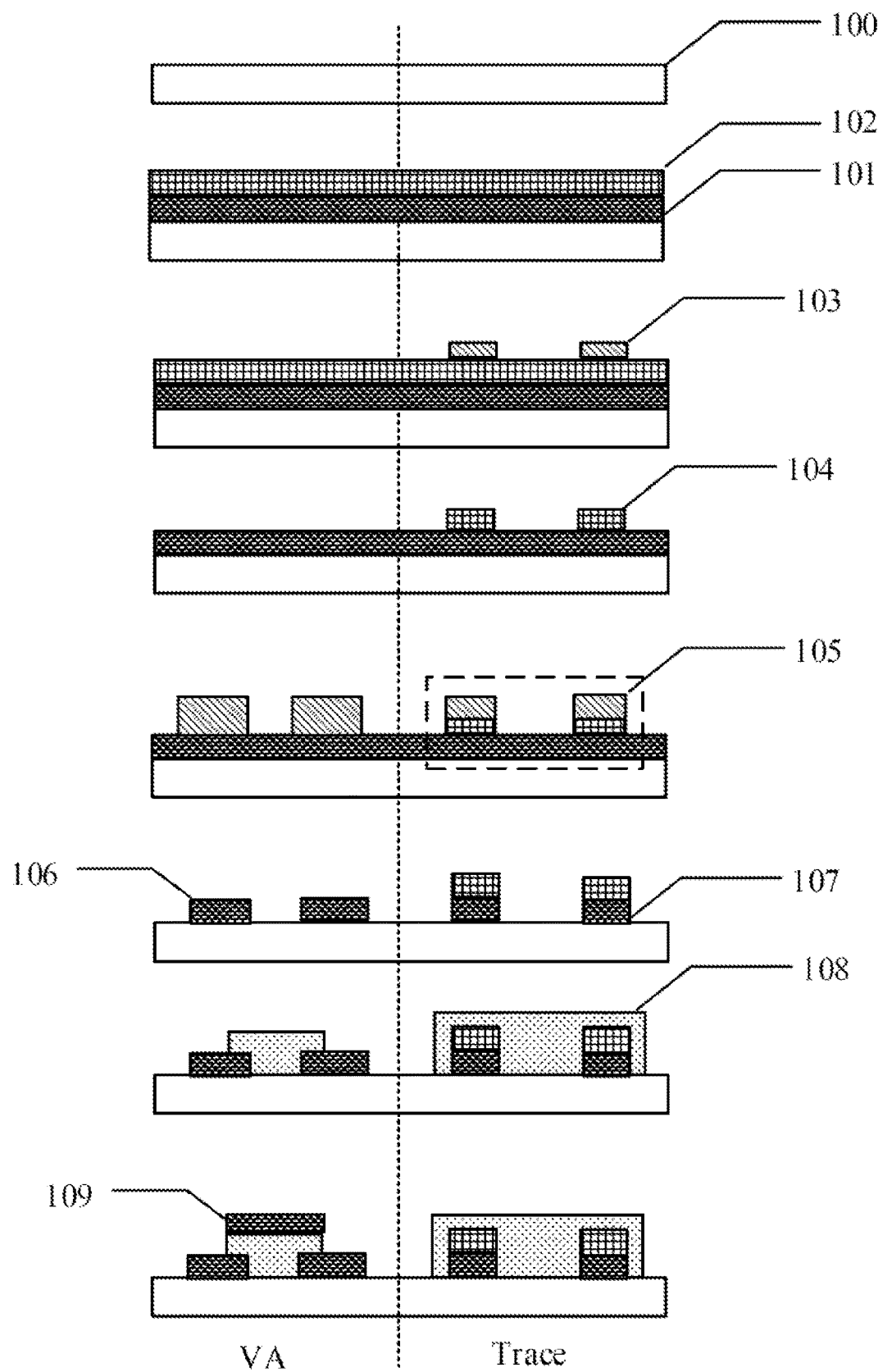
FIG. 1 is a schematic diagram showing a method of manufacturing a touch screen in the related art.

Example embodiments will now be described in detail with reference to the accompanying drawings. However, the example embodiments can be embodied in a variety of forms and should not be construed as being limited to the examples set forth herein; rather, these exemplary embodiments are provided so that this disclosure will be clear and complete to those skilled in the art. The described features, structures, or characteristics may be combined in any suitable manner in one or more embodiments. Many specific details are provided in the following description to give a full understanding of the embodiments of the present disclosure. However, those skilled in the art will appreciate that one or more of the specific details may be omitted or other methods, components, devices, steps, etc. may be employed. In other instances, the prior art solution is not shown or described in detail in order to avoid ambiguity in all aspects of the present disclosure.

The words "a", "an", "the" and "said" are used in the specification to indicate the presence of one or more elements/components, etc.; the terms "comprising" and "having" are used to mean an inclusive meaning, and are meant to include additional elements/components, etc. in addition to the listed elements/components/etc.; the terms "first" and "second" etc. are used only as marks, rather than a limitation on the number of the objects.

In addition, the drawings are merely schematic representations of the present disclosure and are not necessarily to scale. The same reference numerals in the drawings denote the same or similar parts, and the repeated description thereof will be omitted. Some of the block diagrams shown in the figures are functional entities and do not necessarily have to correspond to physically or logically separate entities.

FIG. 1 illustrates a method for manufacturing a touch screen in the related art. The method includes the following steps.

1) A basal substrate 100 is provided. The basal substrate 100 includes a display area (VA area) and a non-display area (Trace area) located around the display area.

The basal substrate 100 is a rigid substrate or a flexible substrate, and the rigid substrate may be made of glass, tempered glass or acrylic plate, or may be a substrate formed by other rigid materials commonly used in the art; the flexible substrate may be COP, PI, PVC, PC, PE or PP, may also be a substrate formed by other flexible materials commonly used in the art, and will not be described herein.

2) A first transparent conductive layer 101 and a metal layer 102 are sequentially formed on the basal substrate 100.

The first transparent conductive layer 101 and the metal layer 102 may be formed by a physical deposition method or a chemical deposition method. The physical deposition method may be a physical deposition method commonly used in the art, such as a magnetron sputtering method, a plasma magnetron sputtering method, an RF magnetron sputtering method, or the like. The chemical deposition method may be a chemical deposition method commonly used in the art, such as a hydrothermal method, a sol-gel method, a chemical vapor deposition method, or the like.

The first transparent conductive layer 101 may be formed of a metal or a transparent conductive oxide. The first transparent conductive layer 101 is optionally formed by using a transparent conductive oxide. The transparent conductive oxide may be one or more of ITO (indium tin oxide) or FZO (F-doped ZnO), AZO (Al-doped ZnO), FTO (F-doped $SnO_2$), GZO (Ga-doped ZnO), and IMO (Mo-doped $In_2O_3$).

In order to form a flexible touch screen, the metal layer 102 may be formed of a flexible metal or metal alloy. Optionally, the metal layer 102 is formed of a flexible metal material, such as Au, Ag, Cu, or other flexible metal materials in the art. Flexible metal materials that are susceptible to bending and that can form metal traces are within the scope of the present disclosure.

3) A first photoresist pattern 103 is formed on the metal layer 102 of the non-display area.

The first photoresist pattern 103 may be formed by using a positive photoresist or a negative photoresist. The positive photoresist may be a photoresist formed by using diazoquinone as a photosensitive compound and a phenolic resin as a basic material. The negative photoresist may be a polycinnamic acid photoresist or cyclized rubber photoresist. The first photoresist pattern 103 is designed according to the shape of the metal trace and the photoresist used.

4) The metal layer 102 is etched to form a metal trace 104.

5) A second photoresist pattern 105 is formed on the first transparent conductive layer 101 and the metal trace 104.

The material of the second photoresist pattern 105 may be same as or different from the material of the first photoresist pattern 103. Optionally the same material is used for these photoresist patterns.

6) The first transparent conductive layer 101 is etched to form a first transparent conductive pattern 106 and a transparent conductive pattern 107 in the non-display area. The second photoresist pattern 105 on the metal trace 104 is removed.

7) A protective layer 108 is formed on the first transparent conductive pattern 106 and the metal trace 104.

The protective layer 108 may be a material commonly used in the art, and optionally is a light transmissive glue such as an organic silicone resin, an acrylic resin, an unsaturated polyester, a polyurethane, an epoxy resin or the like.

8) A second transparent conductive layer 109 is formed on the protective layer 108 of the display area.

The material of the second transparent conductive layer 109 may be the same as or different from the material of the first transparent conductive layer 101, and those skilled in the art may select a suitable material according to actual needs.

In the above preparation method for the touch screen, as shown in FIG. 1, in the step (5), the second photoresist pattern 105 should be arranged on the metal trace 104 formed by the flexible metal, so as to form a composite film layer. However, when the composite film layer is layer-etched, it is desirable that the precision of the alignment of the metal trace 104 and the second photoresist pattern 105 is 3 μm. The alignment accuracy of the equipment greatly affects the line width limit of the metal trace 104.

Figure 2:
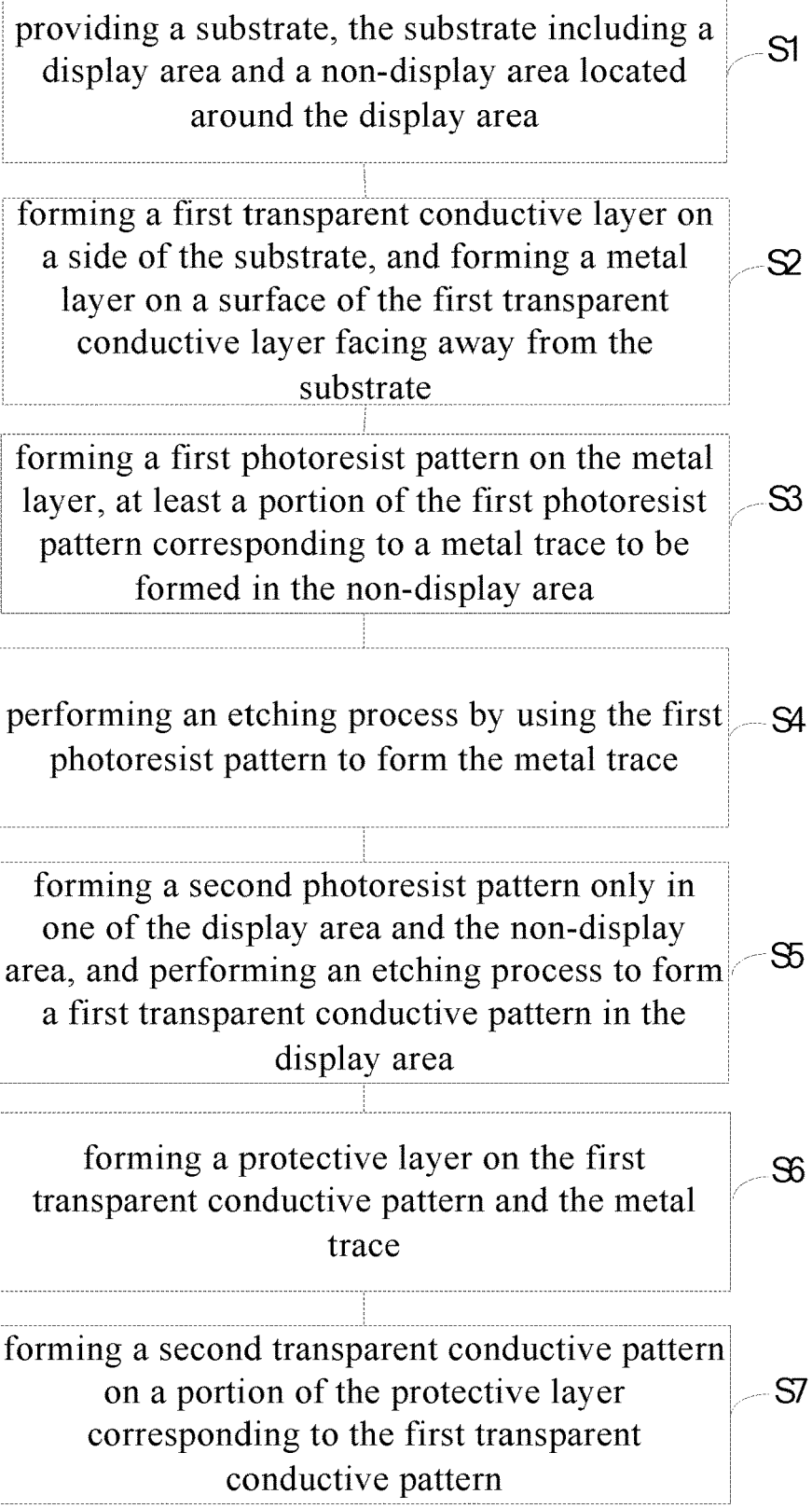
FIG. 2 is a flow chart of a method for manufacturing a touch screen according to an exemplary embodiment.
Figure 3:
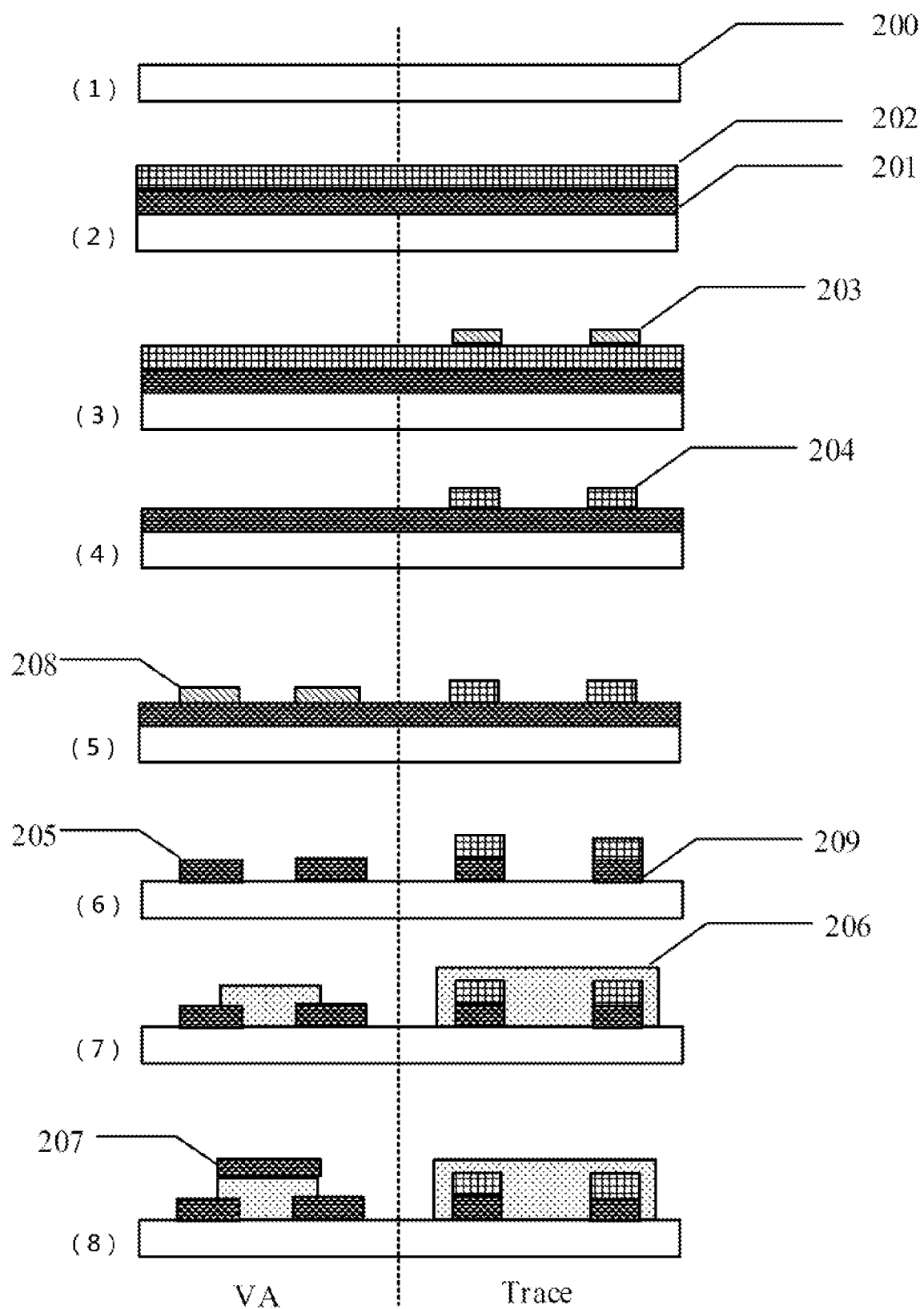
FIG. 3 is a schematic diagram of a method for manufacturing a touch screen according to an exemplary embodiment.

In view of this, embodiments of the present disclosure provide a method for manufacturing a touch screen, and FIG. 2 is a flow chart of the manufacturing method. As shown in FIG. 2 and FIG. 3, the method includes the following steps.

S1: providing a substrate 200, the substrate 200 including a display area (VA area) and a non-display area (Trace area) located around the display area.

S2: forming a first transparent conductive layer 201 on a side of the substrate 200, and forming a metal layer 202 on a surface of the first transparent conductive layer 201 facing away from the substrate 200.

S3: forming a first photoresist pattern 203 on the metal layer 202, at least a portion of the first photoresist pattern 203 corresponding to a metal trace 204 to be formed in the non-display area.

S4: performing an etching process by using the first photoresist pattern 203 to form the metal trace 204.

S5: forming a second photoresist pattern 208 only in one of the display area and the non-display area, and performing an etching process to form a first transparent conductive pattern 205 in the display area.

S6: forming a protective layer 206 on the first transparent conductive pattern 205 and the metal trace 204.

S7: forming a second transparent conductive pattern 207 on a portion of the protective layer 206 corresponding to the first transparent conductive pattern 205.

In the exemplary embodiment, the second photoresist pattern is formed only in one of the display area and the non-display area, and an etching process is performed to form a first transparent conductive pattern in the display area. On the one hand, the line width limit of the metal layer is increased; the adverse effect caused by the misalignment between the second photoresist pattern and the metal trace is thus prevented. On the other hand, the stability and adhesion of the metal layer and other film structures are improved, and the manufacturing method can reduce the processes, save manufacturing costs, and improve manufacturing efficiency.

Figure 4:
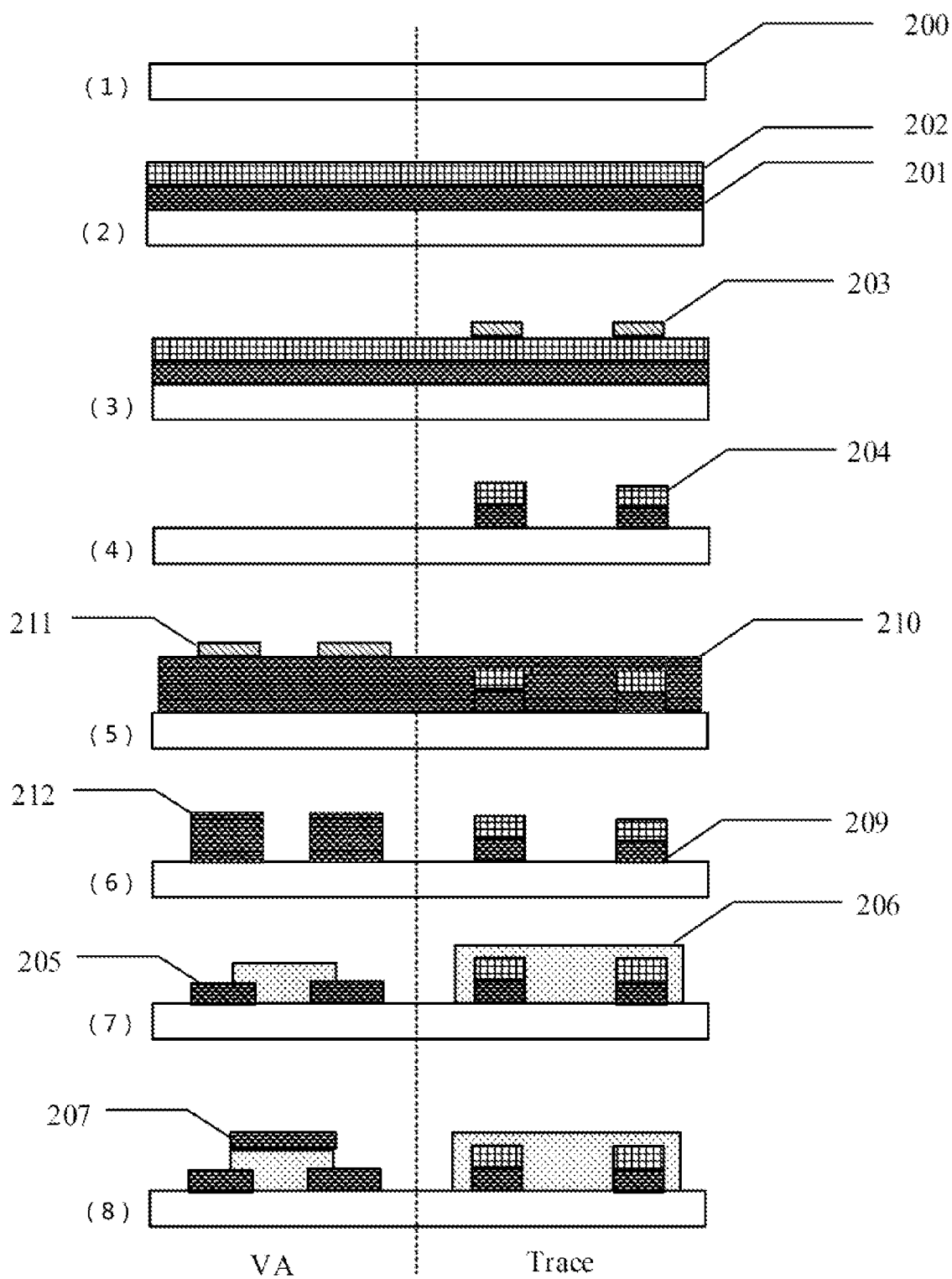
FIG. 4 is a schematic diagram of a method for manufacturing a touch screen according to an exemplary embodiment.

Optionally, as shown in FIG. 3 or FIG. 4, the first photoresist pattern 203 is distributed only in the non-display area.

FIG. 3 shows a workflow (progressing from parts (1)-(8)) of forming the metal trace 204 and the first transparent conductive pattern 205 when the first photoresist pattern 203 is disposed only in the non-display area. The metal layer 202 is etched by using the first photoresist pattern 203 to form the metal trace 204. Then, the second photoresist pattern 208 is formed on the first transparent conductive layer 201 of the display area. The first transparent conductive layer 201 is etched, thereby forming the first transparent conductive pattern 205 located in the display area and the transparent conductive pattern 209 located in the non-display area.

In this method, the metal layer 202 and the first transparent conductive pattern 201 are etched by using the first photoresist pattern 203 and the second photoresist pattern 208 respectively, a structure of the metal trace 204 and the first transparent conductive pattern 205 is formed. When the first transparent conductive pattern layer 201 is etched, the metal trace 204 serves as a protective layer to protect the first transparent conductive layer 201 located under it from being etched.

Therefore, optionally, as shown in parts (3) and (4) of FIG. 3, the step of performing an etching process by using the first photoresist pattern 203 to form the metal trace 204 includes: etching the metal layer 202 by using the first photoresist pattern 203 to form the metal trace 204.

Optionally, as shown in parts (5) and (6) of FIG. 3, the step of forming a second photoresist pattern 208 only in one of the display area and the non-display area, and performing an etching process to form a first transparent conductive pattern 205 in the display area includes: forming, only in the display area, a second photoresist pattern 208 corresponding to the first transparent conductive pattern 205, and performing an etching process to form the first transparent conductive pattern 205 in the display area.

FIG. 4 shows the specific steps of forming the metal trace 204 and the first transparent conductive pattern 205 when the first photoresist pattern 203 is disposed only in the non-display area. After the first photoresist pattern 203 is formed, the first transparent conductive layer 201 and the metal layer 202 are simultaneously etched to form the metal trace 204. A transparent conductive layer 210 is then formed on the substrate 200, and the maximum thickness of the transparent conductive layer 210 may be greater than the total thickness of the first transparent conductive layer 201 and the metal trace 204. The material of the transparent conductive layer 210 may be same to or different from the material of the first transparent conductive layer 201. A photoresist pattern 211 is formed on the transparent conductive layer 210 in the display area, and the transparent conductive layer 210 is etched to form a transparent conductive pattern 212. The transparent conductive pattern 212 is thinned to form the first transparent conductive pattern 205.

The method forms the metal trace 204 by simultaneously etching the first transparent conductive layer 201 and the metal layer 202, and forms the structure of the first transparent conductive pattern 205 by etching and thinning the transparent conductive layer 210. On the one hand, if other film layers are formed on the metal trace in the subsequent process, misalignment may occur, and the line width of the metal trace may be affected. On the other hand, it is not necessary to form a photoresist layer on the metal trace 204, thereby reducing the processes and saving manufacturing costs.

Therefore, optionally, as shown in parts (3) and (4) of FIG. 4, the step of performing an etching process by using the first photoresist pattern 203 to form the metal trace 204 includes: etching the metal layer 202 and the first transparent conductive layer 201 by using the first photoresist pattern 203 to form the metal trace 204.

Optionally, as shown in parts (5) and (6) of FIG. 4, the step of forming a second photoresist pattern 211 only in one of the display area and the non-display area, and performing an etching process to form a first transparent conductive pattern 205 in the display area includes: forming a second transparent conductive layer 210 in the display area and the non-display area; and forming, only in the display area, a second photoresist pattern 211 corresponding to the first transparent conductive pattern 205, and performing an etching process to form the transparent conductive pattern 212 in the display area.

Optionally, as shown in parts (6) and (7) of FIG. 4, the method further includes: thinning the transparent conductive pattern 212 before forming the protective layer 206 on the first transparent conductive pattern 205 and the metal trace 204.

Figure 5:
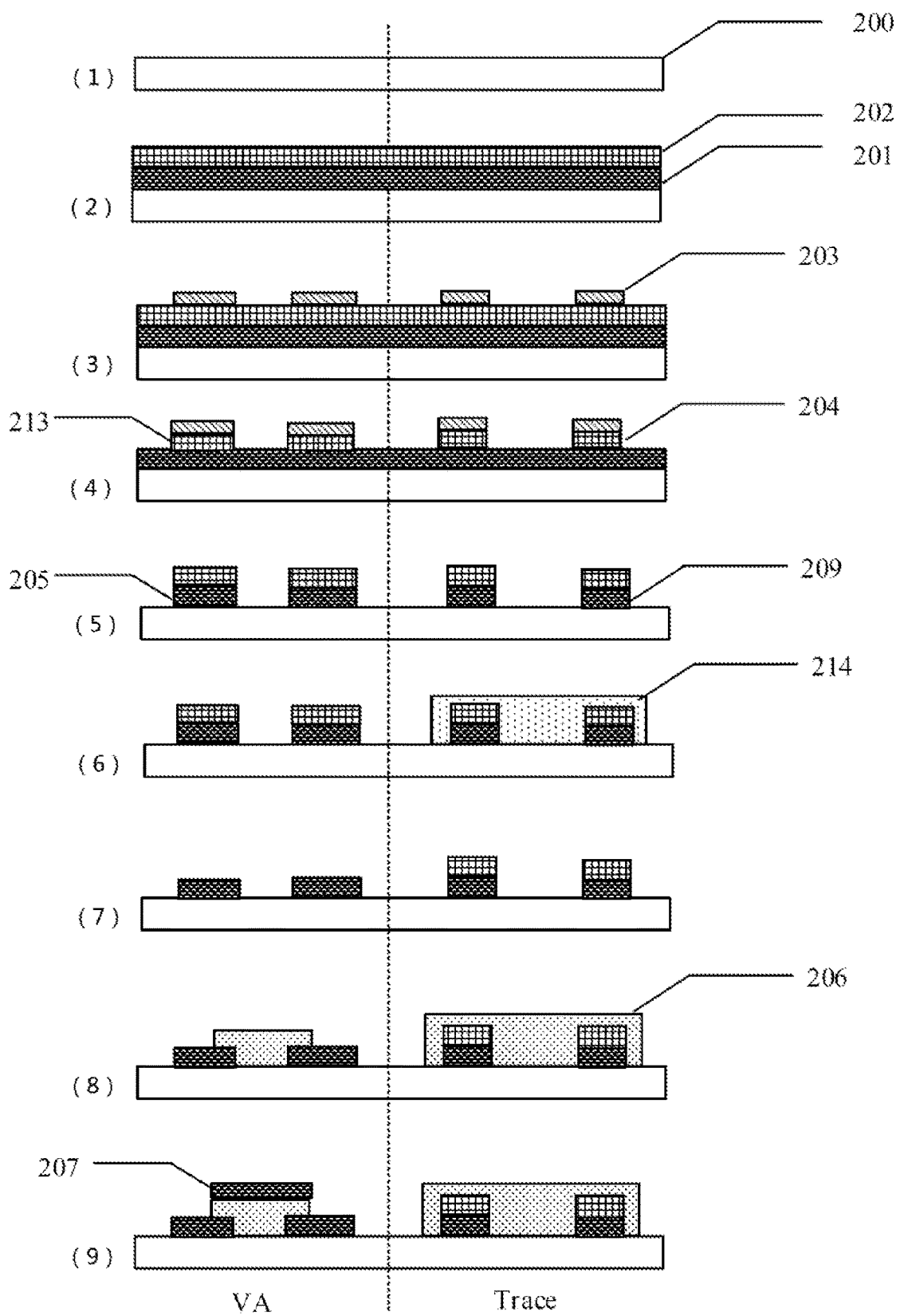
FIG. 5 is a schematic diagram of a method for manufacturing a touch screen according to an exemplary embodiment.

Optionally, as shown in FIG. 5, the first photoresist pattern 203 is distributed in the display area and the non-display area. As shown in part (4) of FIG. 5, the step of performing an etching process by using the first photoresist pattern 203 to form the metal trace 204 includes: performing an etching process on the metal layer 202 by using the first photoresist pattern 203 to form a metal pattern 213 located in the display area and the metal trace 204.

Then, the first transparent conductive layer 201 is further etched to form the first transparent conductive layer 205 and the transparent conductive pattern 209 located in the non-display area. A photoresist layer 214 covering the metal trace 204 is then formed on the metal traces 204 of the non-display area to prevent the metal trace 204 from being affected when the metal pattern 213 in the display area are removed by etching. After the metal pattern 213 is removed, the photoresist layer 214 is removed for subsequent operations. The method also avoids the influence of misalignment on the line width of the metal trace when other film layers are formed on the metal trace.

Therefore, as shown in parts (5)-(7) of FIG. 5, optionally, the step of performing an etching process by using the first photoresist pattern 203 to form the metal trace 204 further includes: performing an etching process on the first transparent conductive layer 201 by using the first photoresist pattern 203 to form a transparent conductive pattern 209 located in the non-display area and the first transparent conductive pattern 205; and removing the metal pattern 213 located in the display area.

Optionally, as shown in parts (5)-(7) of FIG. 5, the step of removing the metal pattern 213 located in the display area includes: forming the photoresist layer 214 covering the metal trace 204 in the non-display area to protect the metal trace 204; and performing an etching process on the metal pattern 213 located in the display area, thereby removing the metal pattern 213 located in the display area.

Optionally, the substrate is one of a COP substrate, a PI substrate, and a glass substrate.

Optionally, the material of the first transparent conductive layer 201 is one of ITO, FZO, AZO, FTO, GZO, and IMO.

Optionally, the material of the second transparent conductive layer 210 is one of ITO, FZO, AZO, FTO, GZO, and IMO.

Optionally, the material of the metal trace 204 is a flexible metal material.

In the context of the present disclosure, "performing an etching process on a layer of a material" means selecting an etching process suitable for the material and etching the layer of the material. For example, for the photoresist pattern layer, a wet etching process may be selected; for the metal layer, a dry etching process may be selected.

Through the method for manufacturing the touch screen provided by the present disclosure, the adhesion of the metal trace and the line width limit are improved, the width of the frame is further reduced, the touch screen has a high screen occupation ratio, and the performance and the service life of the touch screen are also improved.

Figure 6:
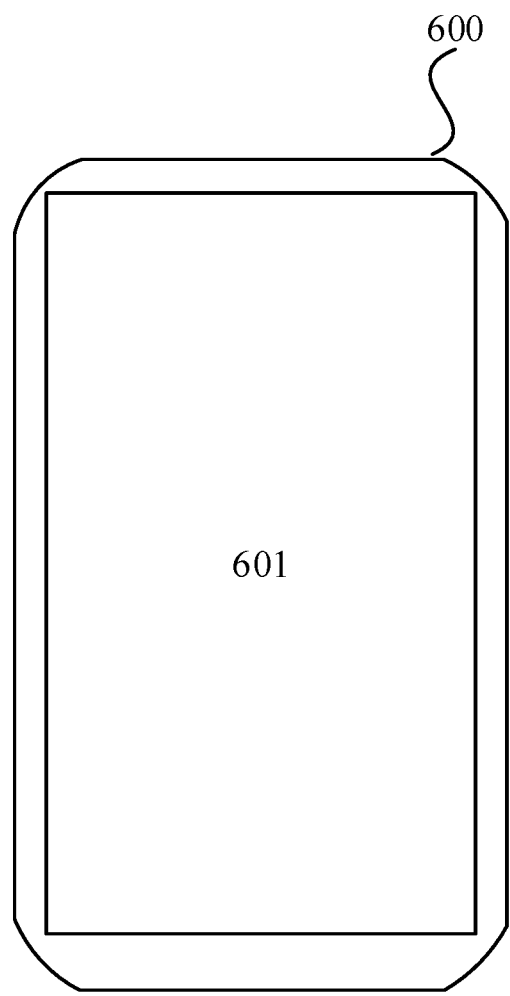
FIG. 6 is a structural schematic diagram of display device according to an exemplary embodiment.

An exemplary embodiment also provides a display device. As shown in FIG. 6, the display device 600 includes a touch screen 601 manufactured by the above-described method. The display device 600 may be a product or component having a display function such as a liquid crystal display, an electronic paper, an OLED display, a mobile phone, a tablet computer, a television, a notebook computer, a digital photo frame, a navigator, or the like.

The above exemplary embodiments are only used for explanations rather than limitations to the present disclosure, the ordinary skilled person in the related technical field, in the case of not departing from the spirit and scope of the present disclosure, may also make various modifications and variations, therefore, all the equivalent solutions also belong to the scope of the present disclosure, the patent protection scope of the present disclosure should be defined by the claims.

What is claimed is:

1. A method for manufacturing a touch screen, comprising:
   providing a substrate, the substrate including a display area and a non-display area located around the display area;
   forming a first transparent conductive layer on a side of the substrate, and forming a metal layer on a surface of the first transparent conductive layer facing away from the substrate;
   forming a first photoresist pattern on the metal layer, at least a portion of the first photoresist pattern corresponding to a metal trace to be formed in the non-display area;
   performing a first etching process by using the first photoresist pattern to form the metal trace;
   forming a second photoresist pattern only in one of the display area and the non-display area, and performing a second etching process to form a first transparent conductive pattern in the display area;
   forming a protective layer on the first transparent conductive pattern and the metal trace; and
   forming a second transparent conductive pattern on a portion of the protective layer corresponding to the first transparent conductive pattern,
   wherein the first photoresist pattern is distributed only in the non-display area, and
   wherein forming the second photoresist pattern only in one of the display area and the non-display area, and performing the second etching process to form the first transparent conductive pattern in the display area comprises: forming, only in the display area, the second photo resist pattern corresponding to the first transparent conductive pattern, and performing the second etching process to form the first transparent conductive pattern in the display area.

2. The method according to claim 1, wherein performing the first etching process by using the first photoresist pattern to form the metal trace comprises:
   etching the metal layer by using the first photoresist pattern to form the metal trace.

3. The method according to claim 2, wherein a material of the metal trace is a flexible metal material.

4. The method according to claim 1, wherein performing the first etching process by using the first photoresist pattern to form the metal trace comprises:
  etching the metal layer and the first transparent conductive layer by using the first photoresist pattern to form the metal trace.

5. The method according to claim 4, wherein forming the second photoresist pattern only in one of the display area and the non-display area, and performing the second etching process to form the first transparent conductive pattern in the display area further comprises:
  forming a second transparent conductive layer in the display area and the non-display area.

6. The method according to claim 5, further comprising:
  thinning the first transparent conductive pattern before forming the protective layer on the first transparent conductive pattern and the metal trace.

7. The method according to claim 6, wherein a material of the second transparent conductive layer is one of ITO, FZO, AZO, FTO, GZO, and IMO.

8. The method according to claim 1, wherein a material of the first transparent conductive layer is one of ITO, FZO, AZO, FTO, GZO, and IMO.

9. The method according to claim 5, wherein a material of the second transparent conductive layer is one of ITO, FZO, AZO, FTO, GZO, and IMO.

10. The method according to claim 1, wherein the substrate is one of a COP substrate, a PI substrate, and a glass substrate.

11. The method according to claim 1, wherein a material of the metal trace is a flexible metal material.

12. A display device comprising a touch screen manufactured by the method according to claim 1.

* * * * *